United States Patent

[11] 3,574,465

[72] Inventor Pierre Poubeau
Gif-sur-Yvette, France
[21] Appl. No. 720,939
[22] Filed Apr. 12, 1968
[45] Patented Apr. 13, 1971
[73] Assignee Nord-Aviation Societe Nationale De Constructions Aeronautiques
Paris, France
[32] Priority Apr. 17, 1967
[33] France
[31] 103,040

[54] METHODS OF MEASUREMENT OF SIGHTING ERRORS OF AN OPTICAL INSTRUMENT AND THE CORRESPONDING MEASURING DEVICE
8 Claims, 6 Drawing Figs.

[52] U.S. Cl. .................................................. 356/152
[51] Int. Cl. .......................................................... G01b 11/26
[50] Field of Search ............................................ 356/141, 152

[56] References Cited
UNITED STATES PATENTS
2,758,377 8/1956 Claret et al. .................. 356/141
3,381,570 5/1968 Anway et al. .................. 356/152

*Primary Examiner*—Richard A. Farley
*Attorney*—Karl W. Flocks

ABSTRACT: Method and device of measurement of the sighting error of an optical instrument and especially a star-sighting device for an artificial satellite, in which at least two images of at least two sighted objects are formed in two orthogonal fields of the image focal plane, two detection signals of light flux in each field are formed, two angular measurements of position with respect to a time base of one of the images of the first field is effected, one of said measurement being transferred into the second field and on the second image of the same object, in order to effect a second measurement and comparing the two measurements obtained.

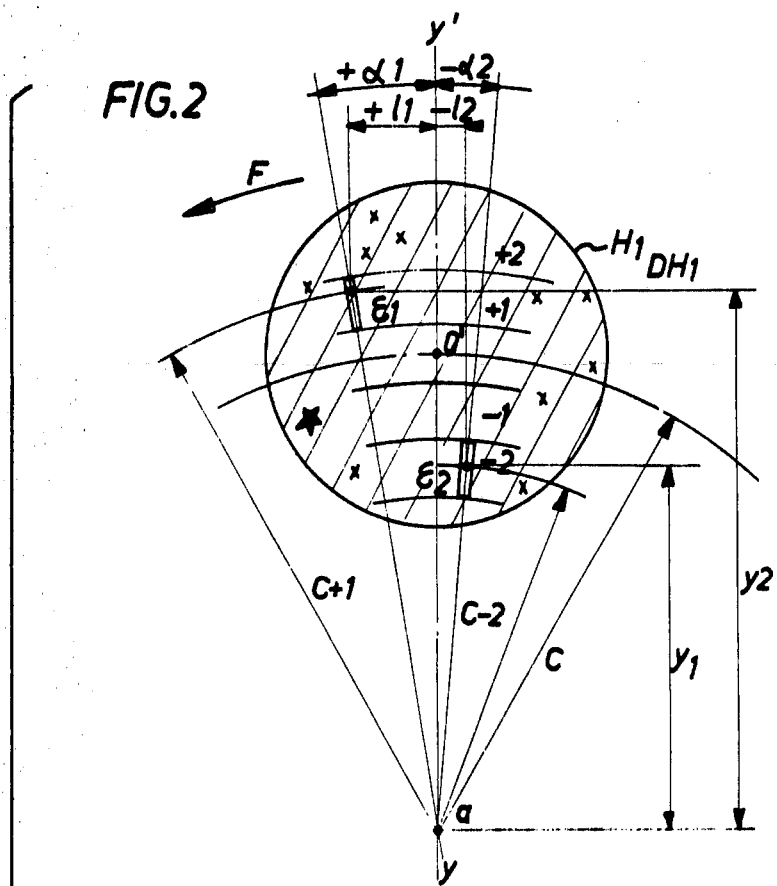
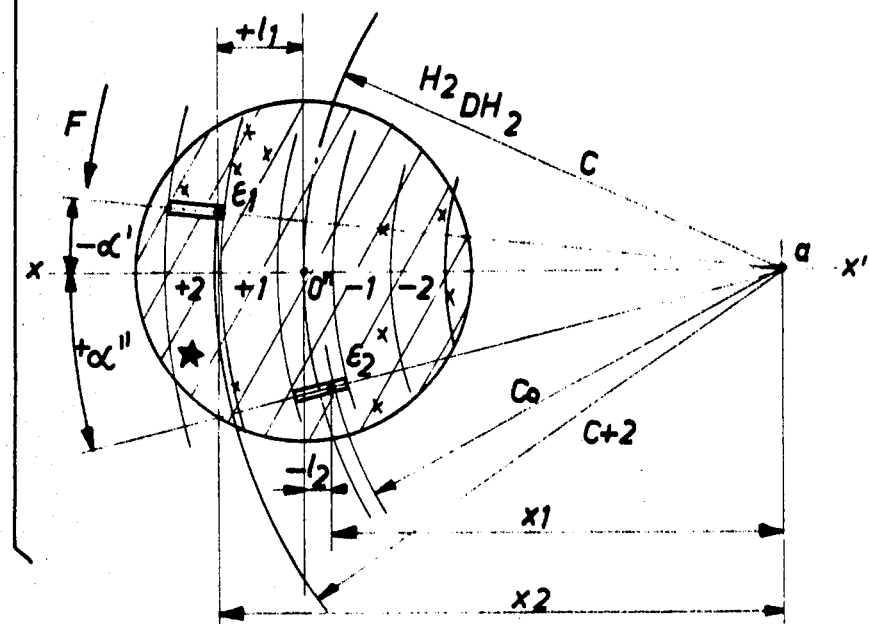
FIG.2

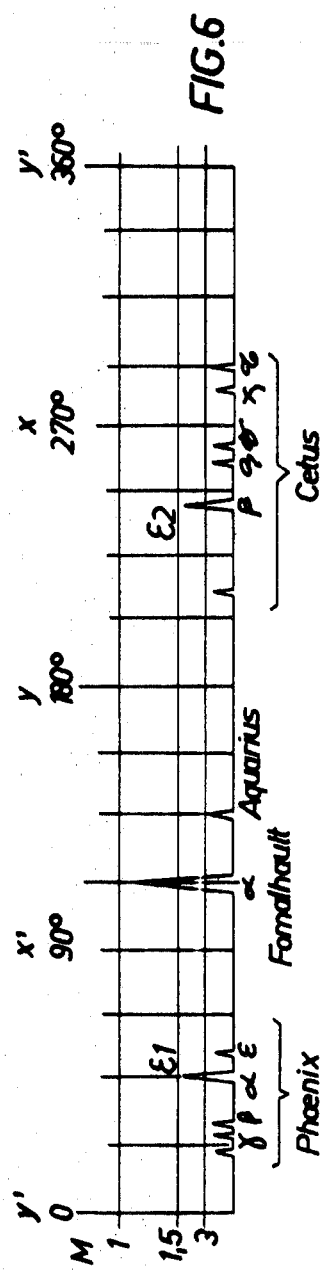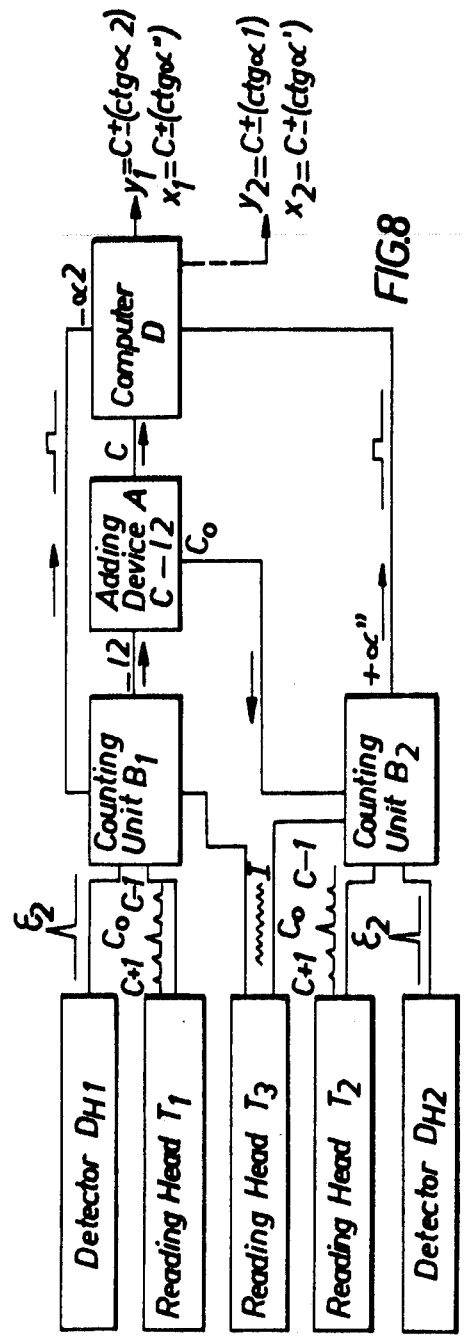

METHODS OF MEASUREMENT OF SIGHTING ERRORS OF AN OPTICAL INSTRUMENT AND THE CORRESPONDING MEASURING DEVICE

The present invention relates to a method of positioning of an optical instrument and especially a star-sighting device for an artificial satellite, together with the corresponding measuring device.

The applicant has already described in his application Ser. No. 700,423 of Jan. 25, 1968, a method of measurement of the sighting error of an optical instrument and the corresponding measuring device. This latter method consists essentially of evaluating the instantaneous difference between the direction of a sighted object and that of the optical axis of the instrument, it being possible to represent this difference by that existing between the effective position of the image of the said sighted object in the focal plane (image) of the optical instrument and the position which this image would have if the optical axis of the instrument coincided exactly with the direction of the object sighted.

Now, while the said method well describes a means which effectively permits the evaluation in the focal plane of the instrument of any angular displacement appearing between the axis connecting the sighted object to the optical center on the one hand and the optical axis on the other hand, for the purpose of permitting in most cases the application of correction couples in order to bring these two axis into coincidence, it does not however give any means of knowing the spatial orientation of the orthogonal reference axes associated with the optical instrument when the axis derived from the object is taken by definition as a fixed reference.

Thus for example, it is not possible to know by this method the orientation of a star-sighting device for an astronomical satellite or even the position of an artificial satellite of any kind, with respect to a group of stars, the positions of which are known.

In addition, the solution which would consist of effecting the measurement of the sighting error following the above method on at least two objects of known positions, so that the analysis of the coordinates of their images in the focal plane of the instrument then permits the determination in an unambiguous manner of the position of the axis coupled to the instrument with respect to the fixed axis joining the sighted objects to the optical center of the instrument, would be liable to result in errors or uncertainties on the positioning of the images of the two objects due to the risk of confusion in the identification of the objects during the operation of analysis by the device.

Generally speaking, it can be stated that none of the methods described in the above-mentioned application is suitable for the measurement of the positioning of two fixed sighted objects with respect to the optical axis of the instrument, this being due to the impossibility of differentiating their two images at the analysis stage of their radial and angular positions. In fact, when two images are to be analyzed by the method described or its alternative form, either, in the case of analysis in a single field, it may be impossible to establish a suitable correlation between the radial measurement of a first image and its angular measurement, the said angular measurement being incidentally capable of being effected on the other image, or alternatively, in the case of analysis in two fields, it may be impossible to identify with certainty the same image measured angularly in the first and the second field.

The present invention overcomes these drawbacks by providing a method and a device for measuring the position of an optical instrument with respect to at least two sighted objects in order to determine in an unambiguous manner the absolute position of the object with respect to a system of reference axis associated with the optical instrument.

The method according to the invention is essentially characterized by the fact that there are formed at least two images of the sighted stars in two fields located in the immediate vicinity of the image focal plane of the optical instrument, that at least two signals are produced by means of at least two detectors of light flux located in each of the said fields, these signals varying as a function of the illumination of the said detectors, that two measurements of position are made on one of the images of the first field, that one of these measurements is transferred to the second field and on to the second image of the same object in order to effect the second measurement.

In accordance with other characteristic features, the surface of the detectors corresponds to the region of the field to be explored, the measurements of position are effected by means of a time base formed by a train of clockwork impulses delivering in particular the initial signals or pulses forming the references of position and counting of time intervals.

In order to carry the above method into effect, the detection device according to the invention, located in the immediate vicinity of the image focal plane of an optical sighting instrument, is essentially characterized by the fact that it comprises a moving member for the optical location of images associated with at least two detectors of optical signals, driven in synchronism with a member defining a time base, and at least two detectors of the time intervals separating the signals of the time base.

According to other characteristic features, the optical locating member is constituted by a thin disc carrying transparent oblong windows having a constant angular spacing and a spiral radial position, the said disc rotating at constant speed; the member defining the time base is constituted by a disc arranged below the disc above, and behind the image focal plane and carries a magnetic track on which are recorded uniform magnetic marks or references; the disc constituting the reference member and the disc constituting the member defining the time base are rotated at a constant speed; the optical signal detectors are preferably constituted by photoelectric elements located under the disc carrying the transparent windows; the detectors for measuring the intervals of time are constituted by magnetic reading heads. Advantageously, the information emitted in the form of signals coming from the optical and magnetic detectors is treated in appropriate electronic circuits, and the amplitude of the optical signals is selected in dependence on the magnitude of the stars sighted.

Other advantages and characteristic features of the present invention will be brought out below in the description which follows of the general principle of the method according to the invention, of measurement of the position of an optical instrument and of one preferred form of embodiment of the corresponding measuring device, intended for a star-sighting device for artificial satellites or space vehicles, the said description being made with reference to the accompanying drawings, in which:

FIG. 2 is a diagrammatic representation in plan illustrating, by means of a simple example taken from a sight of a group of stars, the method of measurement according to the invention;

Figure 7:
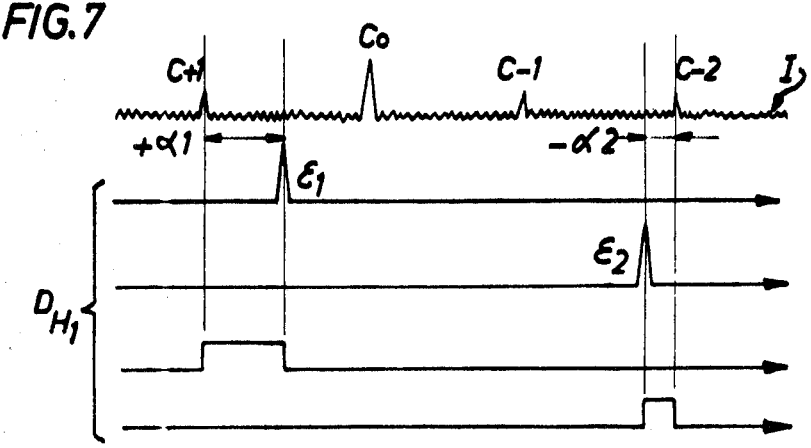
Figure 4A:
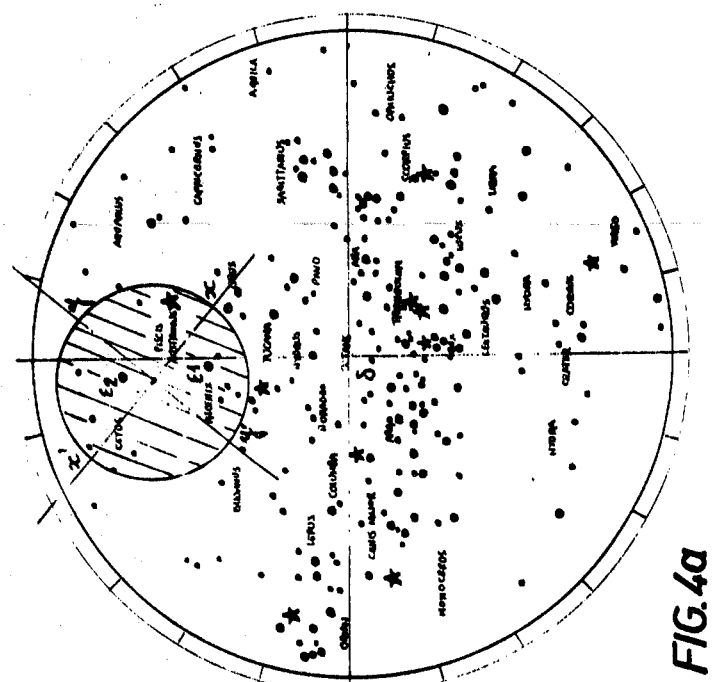
Figure 4B:
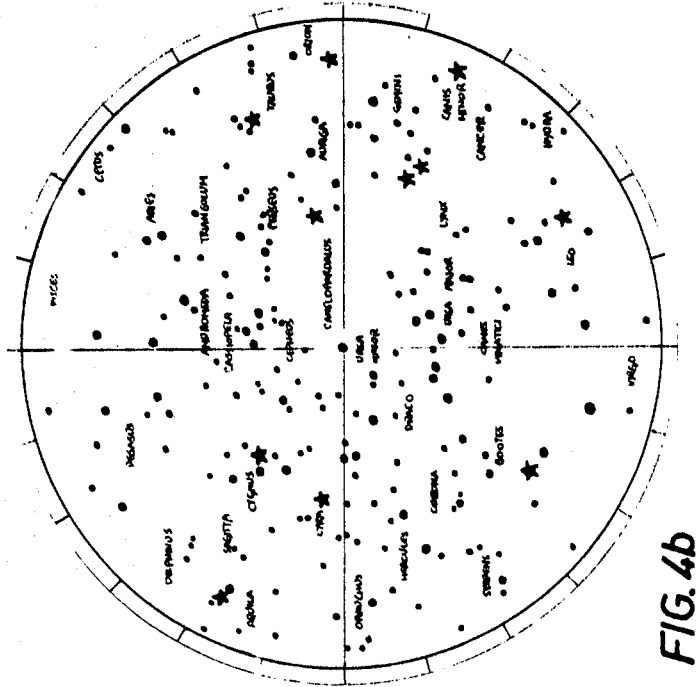
Figure 5:
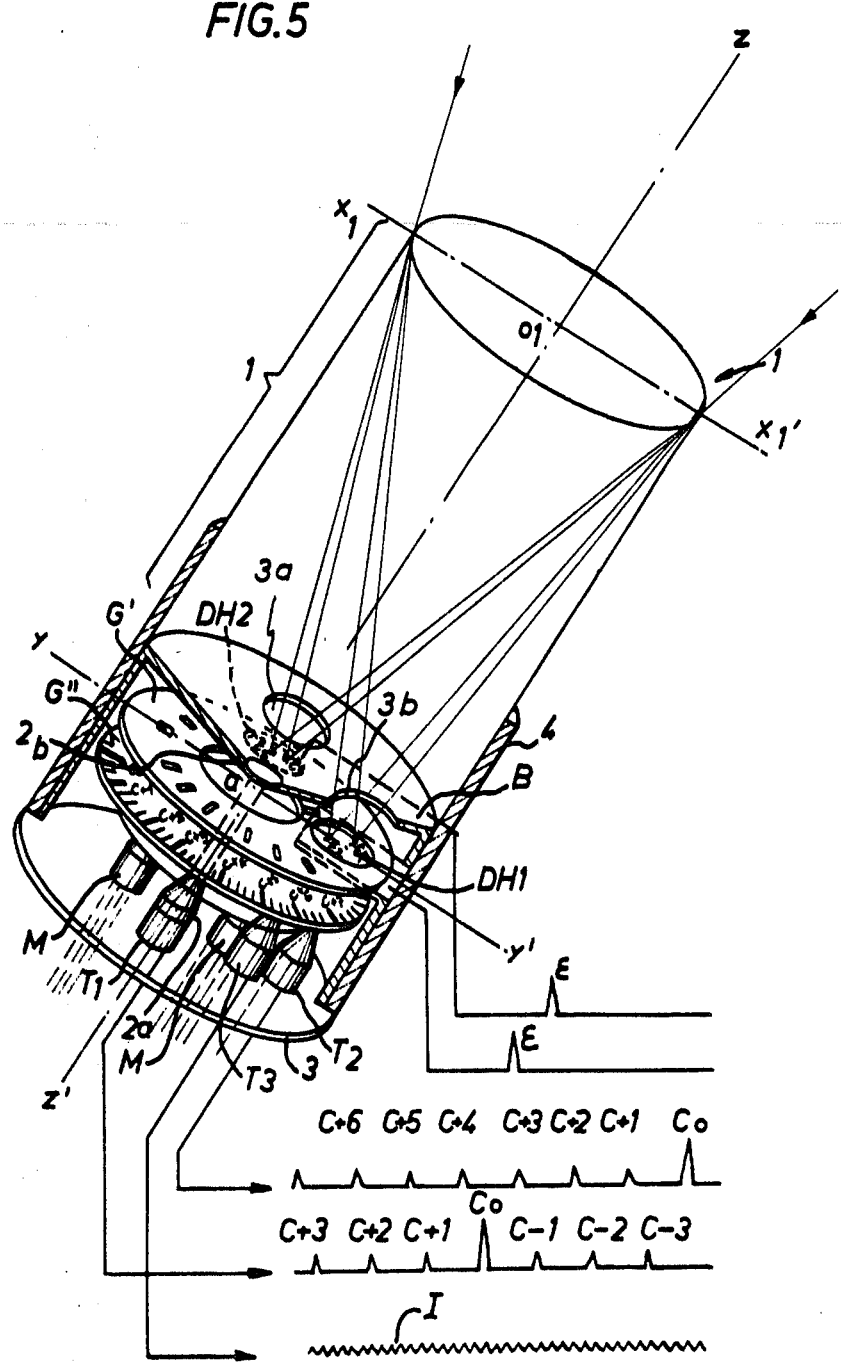

FIGS. 4 a and 4 b show a simplified map of the sky with the localization of the sighting zone which has served to provide the above example;

FIG. 5 is a diagrammatic view in perspective and partial section of a preferred form of construction of a device according to the invention;

FIG. 6 is a diagram showing a possible method of selection of the light signals obtained from a sight;

FIG. 7 is a diagrammatic representation of the signals employed for the analysis of the position of the images;

FIG. 8 is a synoptic diagram of the treatment of the data supplied by the measuring device according to the invention.

Figure 1:
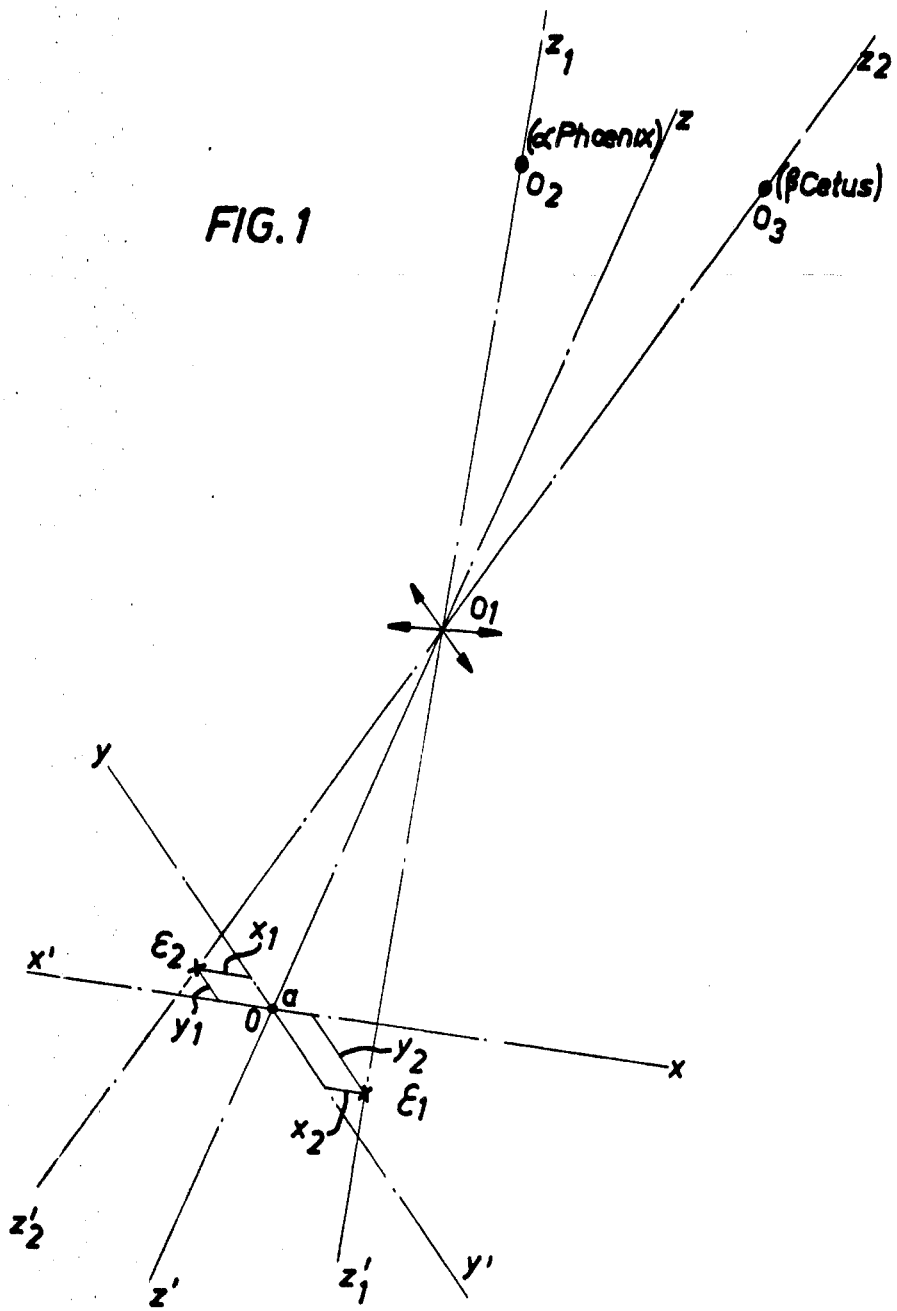
FIG. 1 is a diagrammatic representation illustrating the method of measurement of the position of an optical instrument with respect to two objects forming their images in the focal plane.

In order to explain clearly the method of the present invention, reference will be made to the simple example illustrated by FIGS. 1, 2 and 3, which permits the explanation to be given of the process of measurement of the positions of two objects forming their point images in two orthogonal fields, that is to say arranged in two perpendicular directions $ay'$ and $ax'$ at equal distances from the center $a$. Thus, in this example, it is assumed that an appropriate conventional optical device (not shown) forms in two fields H1 and H2 at right angles, representing the sensitive zones of two photoelectric detectors, twice two point images $\epsilon 1$, $\epsilon 2$ of two sighted objects. The device providing the radial measurement is constituted by an opaque disc G' with a center $a$, comprising transparent oblong openings $j$, elongated in the radial direction, and which rotates about the axis $z-z'$ at equal distance from the centers of the fields H1, H2. The openings $j$ are arranged radially along a spiral going from the lower radial edge $r1$ to the upper radial edge $r2$ of each field and angularly by equal spacings.

The device for effecting precise angular measurements will preferably be a device similar to that described in the above-mentioned application. Thus, the disc G'' with its center at $a$ shown in FIG. 3 may comprise on its periphery for example 2,000 magnetic signs I per millimeter. If its diameter is 50 mm., it will comprise 310,000 signs; it can thus produce, by rotating about its axis, a train of sinusoidal impulses of 310,000 periods per revolution, or 620,000 impulses after rectification by a rectifier bridge.

If under such conditions, the speed of rotation of the disc is for example 2.5 revolutions per seconds (or 0.4 second per revolution) the time interval between two clock work impulses will be $$\frac{0.4}{62 \times 10^4} = 0.6 \mu s$$

while these impulses will have an approximate angular displacement of $$\frac{12,960,000}{620,000} \# 2''$$

of arc between them, the said impulses being read by means of a reading head $T_3$ such as that described in the text of the above-mentioned patent application. The symbol "0" as used herein, means "substantially equal to."

Figure 3:
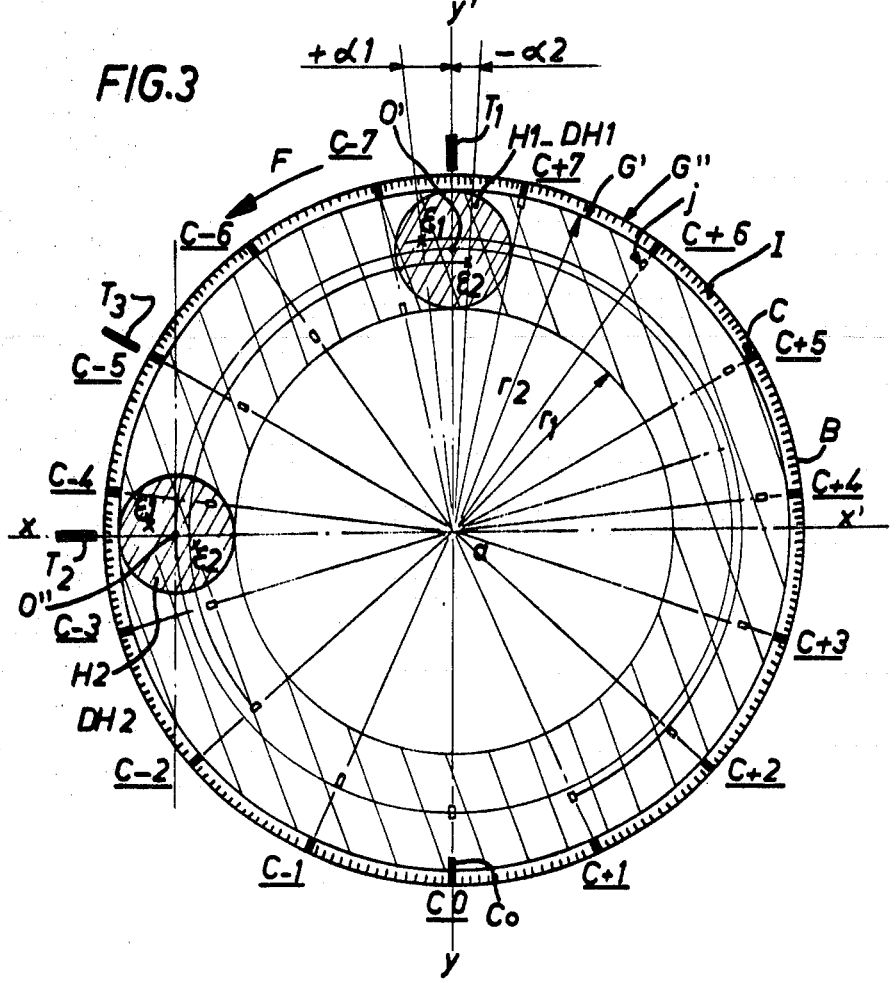
FIG. 3 shows diagrammatically a plan view of a possible arrangement of the means of analysis in the above example.

In addition, if this disc comprises, as indicated in FIG. 3, magnetic reference signs C uniformly spaced apart and distributed on each side of a characteristic reference sign Co, and if these signs are read by reading heads $T_1$ and $T_2$ placed on perpendicular axis $ay'$ and $ax'$, it is seen that it is then possible, in a manner similar to that already referred to in the above application, to obtain the opening of an electronic gate for each signal C received by each reading head, and the closure of this same gate during the appearance of signals not associated with the rotation of the disc supplied by elements such as for example light-flux detectors constituted by photoelectric cells.

Thus, the counting of the number of impulses I between the opening and closing of each gate will provide an angular value $\alpha$ between the instant at which the sign C appears and that at which the signal appears in the detector. The discs G' and G'' (shown in the same plane in FIG. 3 for reasons of convenience) are rigidly fixed to each other and can consequently be driven in rotation at the same speed.

The measurements are made following the method now indicated: the disc G'' while rotating will first supply to the heads $T_1$, $T_2$, $T_3$ different trains of impulses, depending on the frequency and amplitude of the magnetic signs recorded. The heads $T_1$ and $T_2$ will then supply signals $C^+$... $C^1$... and Co (FIGS. 3, 5 and 7), which will define the radial position of each window in each field and will make it possible to know subsequently the value of the displacement of an image with respect to the axis of rotation of the discs, and $T_3$ will supply impulses I which will subsequently serve to give the angular reference of an image with respect to the reference axis associated with the optical instrument.

Referring to FIGS. 2 and 3 and assuming that the discs with windows and with magnetic signs G'' are rotating in the direction of the arrow F about $a$, it can be stated that, at a given moment, a transparent window C-2 will allow the image $\epsilon 2$ to illuminate the sensitive surface of the field H1 and in consequence to produce a signal of a certain amplitude which will furthermore be a function of the illumination of the detector. Thus, three indications will be supplied:

The "weight" of the window by its radius C-2.
The angle $-\alpha_2$ which is defined by counting the impulses I between the appearance in the detector of the signal $\epsilon 2$ and the passage of the window C-2 over the axis $ay'$; and
The electronic amplitude of the signal $\epsilon 2$.

This makes it possible to know, for a given image, its radial position with a certain approximation which is furthermore a function of the length of the window, and its precise angular position, the width of each window being in fact as small as possible. From the indications obtained, it is then possible to derive a value $-1_2$ which will be proportional to the sine of the angle $\alpha_2$ made by the ray corresponding to the window C-2 with the axis $ay'$.

If reference is then made to the field H2, it is obvious, if the optical instruments are suitable, that $\epsilon 2$ will again be found at the same distance $-1_2$ from 0'' and that by algebraic addition of $-1_2$ and C, it will be easy to find out the "weight" of the new window Co which will enable, by counting the number of impulses I between the passage of Co over the axis $0''x$ and the appearance of the signal $\epsilon 2$ on the second detector, a precise measurement $+\alpha''$ of $\epsilon 2$ to be determined this time with respect to the axis $ax$.

Similarly, it will be possible to effect in the same manner the same measurements on $\epsilon 1$ without risk of confusion of identification between $\epsilon 2$ and $\epsilon 1$.

Thus, after suitable selection of the amplitude of the electronic signal of the images $\epsilon 1$ and $\epsilon 2$ and a precise measurement of the angles $\alpha_1$, $\alpha'$ and $\alpha_2$, $\alpha''$, it will be possible, as described and shown in the above-mentioned application (FIG. 8) to effect the measurement of the values $x1$, $x2$ and $y1$, $y2$ which will supply the desired coordinates of the images $\epsilon 1$ and $\epsilon 2$.

Referring to FIG. 4 $a$ and assuming, by way of example, that the sight is made on a part of the sky located in the Austral region in the "Phoenix-Cetus" constellations and that the optical measuring instrument has an opening of about 60°, it can be seen, as shown by the graph in FIG. 6, that the stars successively analyzed by the detectors $DH_1$, $DH_2$ (FIG. 8) in the anticlockwise direction, can be distinguished according to their magnitude M, such that for $\gamma$, $\beta$, for example M>3, for $\alpha(\epsilon 1$ in the text) M>1.5...,for $\beta(\epsilon 2$ in the text) M>1.5... and for T M>3.

In this way and by means of an appropriate electronic filter, it will be possible to select only the signals of the images $\epsilon 1$ and $\epsilon 2$ corresponding to magnitudes M comprised between 1.5 and 3. Similarly, if this same region of sky considered is explored in the two fields H1, H2 (FIGS. 2 and 3) it is seen that the knowledge of the values $x1$, $x2$ and $y1$, $y2$ will lead to the definition, as shown in FIG. 1 and already explained, of the coordinates of the images $\epsilon 1$ and $\epsilon 2$ so as to permit the determination of the position of the optical axis with respect to the objects sighted.

Considering by way of example numerical values such that for images of stars of magnitude 1.5<M<3, the approximate number of electrons detected on each photocathode of the detectors DH1 and DH2 with a useful diameter of 10 mm., is $3 \times 10^5$ electrons/cm.$^2$/ second in the wavelength range of 0.4 to 0.8 $\mu$ and taking, for an optical instrument such as that shown in FIG. 5, an opening of about 60° for any optical system of 5 cm. (4 cm. useful, or 12 cm. $^2$), a disc G' of 60 mm. in diameter and a magnetic disc G'' of 50 mm. in diameter driven at $\omega 2.5$ revolutions per second, a distribution of the windows $j$ over 15 equidistant sectors and following a spiral located between $r_1$ (minimum) = 20 mm. and $r_2$ (maximum) = 30 mm., an opening of these windows of 4° radially or $$\frac{10 \text{ mm.} \times 4°}{60°} = 0.66 \text{ mm.}$$

and 18' angularly or $$\frac{10 \text{ mm.} \times 18'}{3,600''} = 0.05 \text{ mm.}$$

and a train of 620,000 magnetic impulses I per revolution on the disc $G''$, there can then be deduced the time $t$ of passage of a window over an image, namely $$t = \frac{10^6 \times 18'}{2.5 \times 21.600'} = 36\mu \text{ sec.}$$

Similarly, the number $N$ of electrons detected with an average photocathode efficiency of 15 percent and assuming an average efficiency of 80 percent for the optical system, then becomes:

... $N$ (per sec.) = $3.10^5 \times 12 \times 0.8$   $3.10^6$ electrons/sec.
and thus $$N(\text{real}) = \frac{3.10^6 \times 36}{10^6} \#100 \text{ electrons}$$

while the number of impulses I counted during the time of illumination by each window is:

$$\frac{620.000 \times 18'}{21.600'} \#500 I$$

Thus, in FIG. 7, the flat-topped electronic waves $+\alpha 1$ supplied for example by counting the impulses appearing between the reference signal $C+1$ (deducted algebraically from the characteristic signal $C_o$) and the end of the photoelectric signal $\epsilon 1$ supplied by the photoelectric detector, will be given with an angular relative precision of 500 impulses I or 0.05 mm., this same accuracy being of course identical for the measurement of $-\alpha_2$ in C−2, while the radial accuracy will remain at 0.66 mm. in the first and second measurement.

In FIG. 5, which indicates a preferred form of construction of the device according to the invention, there has been shown a sighting device 1 provided with a position measuring device such as illustrated in FIGS. 2 and 3 and already described above.

This apparatus is essentially constituted by a sighting device comprising an optical system 1 of the usual type forming a real image, at the outlet of which the beams of light coming from the objects $0_2$ and $O_3$ pass through two openings 3 $a$ and 3 $b$ formed in the opaque upper plate of the casing B so as to illuminate respectively the two detectors $DH_1$ and $DH_2$.

It is, however, obvious that any optical system producing an equivalent result, namely the formation on each of the two detectors $DH_1$ and $DH_2$ of an image of one single object could be suitable. Thus, a device constituted by a mounting of the "-Cassegrain" or "Gregory" type or any other equivalent system such as described in the above-mentioned application would be suitable, irrespective of the optical system employed from amongst those preceding.

The discs $G'$ with transparent windows and $G''$ with magnetic signs shown in FIG. 3, are driven integrally and concentrically to the axis $z$-$z'$ by means of the magnetic field produced by two coils M synchronously or asynchronously. Their rotative mounting is ensured by two pivots 2 $a$, 2 $b$ either of the clockwork type with rubies or of the ball bearing type with precision balls in a double row so as to avoid any possible jamming; the axis of rotation is furthermore mounted on the casing 3. This latter is provided with openings 3 $a$, 3 $b$ for the passage of the corresponding optical beam and it receives three magnetic reading heads $T_1$, $T_2$, $T_3$ respectively for reading the reference signs and the magnetic signals, these three heads being arranged under the disc $G''$.

A support 4 receives the optical mounting 1 together with the casing 3 and permits the mechanical centering and ease of dismantling the assembly. The electrical connections intended to transmit information signals to the electronic circuit for treating these signals pass out of the casing 3.

To obtain the final result necessitates in fact the utilization and the treatment of the information signals supplied by the reading heads and the detectors mentioned above.

FIG. 8 illustrates diagrammatically one possible form of construction of an electronic circuit for treating the information supplied by the position-measuring device of an optical instrument according to the invention.

In a circuit of this kind, DH1, and DH2 are the photoelectric detectors, $T_1$ and $T_2$ are the reading heads generating the reference signs C, $T_3$ is a reading head generating the signals I, $B_1$ is a counting unit for impulses I between each reference sign and each photoelectric sign (defining in fact an angular value) and for calculating the value $l$ deduced from the angular value and for finding the "weight" of the window concerned, A is an adding device of the constant C with the value $l$, $B_2$ is a counting unit for impulses I between the reference sign found by A and the photoelectric signal supplied by the detector DH2 as a function of the selection made by the window of suitable "weight" (this unit thus supplies an angular value), and finally D is a computer-summation device for the preparation of the values $x$ an $y$ which finally provide the desired indications in the manner indicated furthermore in the above-mentioned application. Referring to the sighting case given above, it is seen that DH1 and DH2 will supply the photoelectric signs $\epsilon 2$ (assumed to have a suitable level) and $T_1$, $T_2$ the signs ... C+1, Co, C−1 ..., $T_3$ will produce the impulses I sent to $B_1$ and $B_2$; the whole arrangement is such that A then receives $-1_2$ from $B_1$ and sends Co, taken from C−1 $_2$ towards $B_2$, and that D receives $-1_2$ from $B_1$, $+\alpha''$ from $B_2$, C from A so as finally to produce $y1 = C \pm (C \text{ tg } \alpha_2)$ and $x1 = C \pm (C \text{ tg}\alpha'')$ which will then define without ambiguity the final position of $\epsilon 2$ with respect to the optical axis $z$ $-z'$. It is to be understood that the symbol "tg" means "trigonometrical tangent" of an arc or an angle and that "$tg\alpha_2$" means trigonometrical tangent of angle $\alpha_2$, and "tg $\alpha$" means trigonometrical tangent of angle $\alpha''$. Thus, by successive measurement of $\epsilon 2$ and the $\epsilon 1$ ... (the number of images not being limited), it is possible to know the position of the optical axis with respect to the sighted objects.

The present invention thus makes it possible to measure the "attitude" of an artificial satellite with respect to a group of objects which are considered as fixed, such as the stars, the positions of which on the astronomical chart are perfectly well known.

A measurement of this kind can in fact serve, either to evaluate the aiming error of a telescope or of an observation device mounted on a satellite, or, by acting on appropriate driving devices, permit the distant piloting of the said satellite in an open loop for example. Thus, in this latter case, a number of sighting devices according to the invention having appropriate openings for covering the whole of the optical field of the satellite, are arranged on this latter in such manner that the said satellite can always identify a part of the sky in order constantly to check its position.

Similarly, a combination of several sighting devices with different openings can be utilized for rough, average and fine measurements of position.

In all cases, the reference information such as the astronomical chart, may either be stored on board the satellite or transmitted by a suitable base by any appropriate transmission means (radio-electric waves LASER beam, etc.).

It will of course be understood that the applications of the method and the device described above are not limited to the cases described.

Similarly, the treatment of the magnetic signals relating to the measurement of very weak light intensities, and which comprises the integration of a large number of measurements of I signals in order to reduce the error on the final position of the image, can be effected, in accordance with the method described in the above-mentioned application. It will further be understood that the present invention has only been described and illustrated by way of explanation, and not in any limitative sense, and that any useful modification can be made thereto, without thereby departing from its scope.

I claim:

1. In a method of measurement of the sighting error of an optical instrument and especially a star-sighting device for an artificial satellite, comprising the steps of: forming at least one image of a sighted object in the focal plane of the optical device; detecting the light flux thus obtained; intercepting it at a predetermined frequency; forming a reference signal of light flux; forming a time base with initial reference; associating said detected light flux with said time base and measuring in angular measurement of time elapsed between the reference signal of light flux and the reference signal of the time base, the improvement consisting of: forming at least two images of at least two cited objects in two orthogonal fields located in the immediate vicinity of the image focal plane of the optical instrument, forming at least two detection signals of light flux in each of said fields, effecting two angular measurements of position on one of the images of the first field, transferring one of said measurements into the second field and on the second image of the same sighted object in order to effect the second measurement, and comparing the two measurements obtained, whereby there is obtained the measurement of the sighting error of the optical instrument.

2. Am improved method as claimed in claim 1, in which the sighted objects are stars of known positions.

3. In a device for measuring the sighting error of an optical instrument consisting of an optical unit forming an image of a sighted object in the focal-image plane in at least one field of said focal plane, and interception disc for interrupting light flux at predetermined frequency issuing from said field, a light flux detector placed below said disc, a disc carrying magnetic signals with reference signals, forming a time base and driven at constant speed in synchronism with said interception disc, a detector for the signals of said time base, said detectors being connected to a measuring unit; the improvement consisting of an optical apparatus comprising an opaque casing pierced with two openings corresponding to two orthogonal fields located in the vicinity of the focal-image plane, moving means for optically locating light flux associated with at least two optical signal detectors corresponding to each of the two fields, driven in synchronism with a means for defining a time base associated with at least two detectors of the time intervals separating the signals of said time base and a measuring unit coupled to the light flux and time-interval detectors.

4. An improved device as claimed in claim 3, in which said moving means for optically locating light signals is a thin disc provided with oblong transparent windows having a constant angular spacing and a spiral radial position, said disc rotating at a constant speed.

5. An improved device as claimed in claim 3, in which said means for defining a time base is constituted by a disc arranged below the optical locating disc and behind the image focal plane and carrying a magnetic track on which are recorded regular magnetic marks or references, and rotating at constant speed.

6. An improved device as claimed in claim 3, in which the optical signal detectors are constituted by photoelectric elements located under the disc carrying the transparent windows.

7. An improved device as claimed in claim 3, in which the detectors for measuring time intervals are constituted by magnetic reading heads.

8. An improved device as claimed in claim 3, in which the measuring unit comprises a unit for counting the impulses between each time reference sign and each light flux detection sign, an adding device for the initial reference constant of light flux and of the displacement of this latter with respect to said constant and derived from the first detector, a unit for counting impulses between the counting issuing from said adding unit and the light flux detection signal derived from the second detector, and a computer-summation device supplying the desired coordinates.